UNITED STATES PATENT OFFICE.

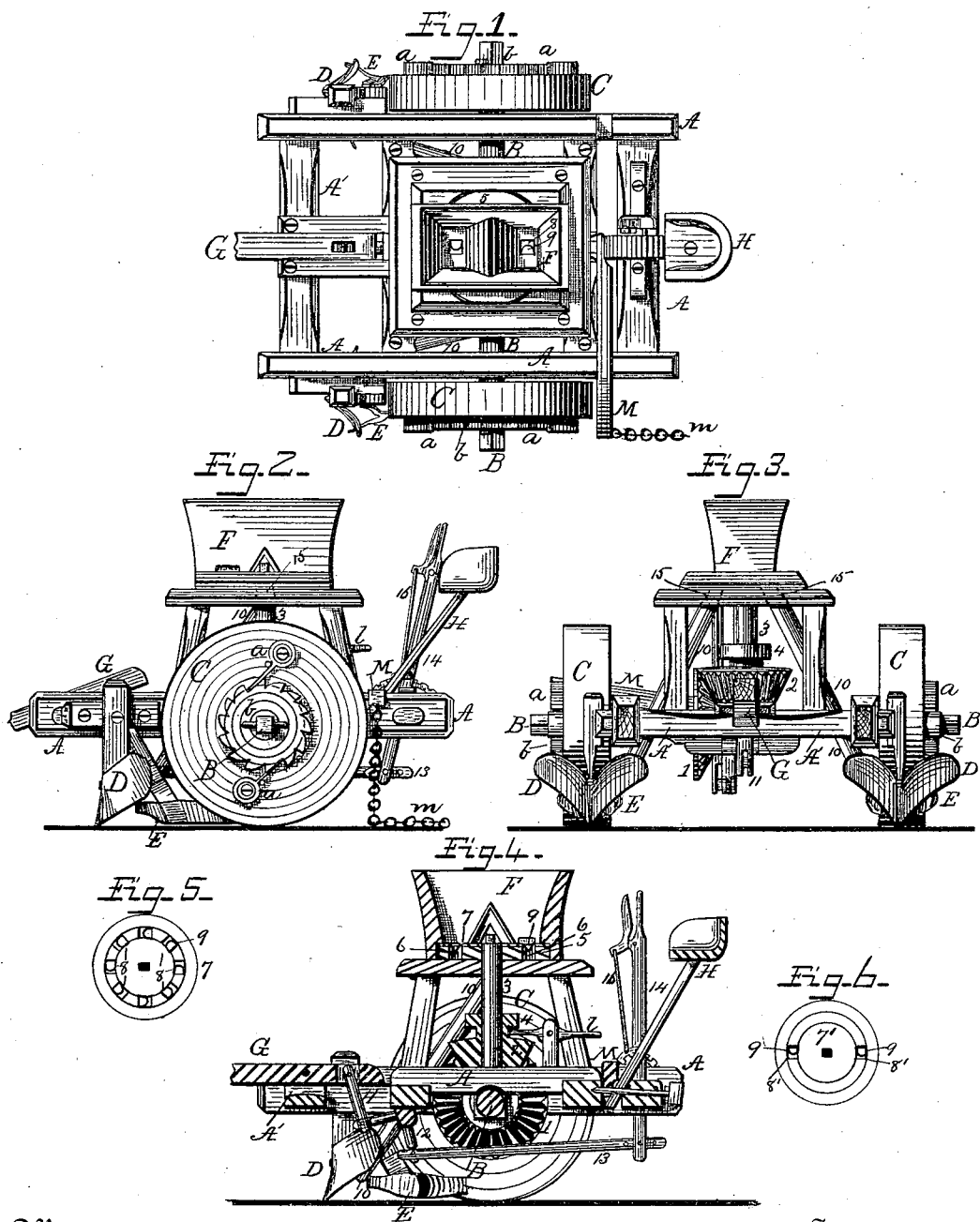

FRANK W. AYERS, OF STANTON COUNTY, ASSIGNOR OF ONE-HALF TO WALLACE W. AYERS, OF DERMOT, KANSAS.

SEED-PLANTER.

SPECIFICATION forming part of Letters Patent No. 388,331, dated August 21, 1888.

Application filed December 13, 1887. Serial No. 257,758. (No model.)

*To all whom it may concern:*

Be it known that I, FRANK W. AYERS, a citizen of the United States, residing in Stanton county, Kansas, and near Dermot, in the county of Stevens and State of Kansas, have invented certain new and useful Improvements in Seed-Planters; and I do hereby declare the following to be a full, clear, and exact description of the invention, such as will enable others skilled in the art to which it appertains to make and use the same.

My invention is an improvement in check-row seed-planters; and my said invention consists in certain details of construction and arrangement of the parts composing said planter, as will be more particularly described in the following specification, and form the subject-matter of the appended claims.

The object of this invention is to provide a seed-planter that will automatically perform the function of opening the furrow, dropping the seed, covering the same, and marking the rows, and be simple in construction and operation, and also be adapted for either drilling the seed or as a check-row planter; and to this end I proceed as follows, reference being had to the accompanying drawings for a better understanding of the details of the same, and in which drawings—

Figure 1 represents a plan view, Fig. 2 a side and Fig. 3 a front elevation, of a check-row seed-planter and drill constructed according to my invention. Fig. 4 is a central longitudinal sectional elevation. Figs. 5 and 6 illustrate detail views of the removable seed-disk.

Similar letters and figures of reference indicate like parts in the several views.

A is the main frame of the machine, transversely across which is journaled the axle B for the supporting-wheels C C. These wheels C are loose upon the axle B and revolve or turn freely backward thereon, but are united to and prevented from turning independent of the axle in its forward movement by a pawl-and-ratchet connection, as shown in Fig. 2, $a$ being the pawls, which are secured to the wheel C, and $b$ the ratchet-wheel keyed to the axle B. The teeth of the ratchet-wheel face rearward, so that in the rearward revolution of the wheel C the pawls $a$, which are secured to the face of said wheel, will slip over the said ratchet-teeth. The axle B will therefore remain stationary. In the forward movement of the wheel C the pawls $a$ engage the shoulders of the ratchet-teeth of the wheel $b$ and lock the wheel C to its axle.

About midway of the shaft or axle B is keyed a bevel gear-wheel, 1, which meshes with a similar gear-wheel, 2, keyed upon a short vertical shaft, 3. This gear-wheel 2, while it is keyed so as to turn with its shaft 3, has a vertical adjustment upon said shaft, and is operated by a foot-lever, $l$, engaging a collar, 4, on the hub of said wheel. Upon the top end of the shaft 3 is fixed the seed-distributing device, which consists of a circular disk, 5, having a series of holes, 6, through the outer edge thereof. Upon the top of this disk is a similarly-sized plate, 7, Fig. 5, having perforations 8 to correspond with the perforations in the disk 5, this plate being employed when the machine is used as a drill. When used as a check-row planter, a plate, 7', Fig. 6, is substituted similar in size to that in Fig. 5, but having only two perforations, 8', as shown, whereby the seed is dropped at intervals and not continuously. A lip, 9, is formed to one edge of each of the openings 8 8' in the disks 7 7', so that upon the adjustment of these disks the opening 6 in the disk 5 may be increased or lessened, as desired, to contain but two or three or a number of seed. These openings 6 in the disk 5 communicate with openings 15—one upon opposite sides of the platform 16, upon which the disk 5 revolves, and also upon which the hopper is supported. These openings 15 communicate with the seed-delivery tubes 10 10, which extend downward and forward and terminate immediately before the ground-wheels C and behind the furrow opener or plows D D.

E E are the coverers, which, together with the plows D, are made adjustable, so as to regulate the depth of planting.

F is the hopper, the bottom of which is somewhat narrower than the diameter of the seed-disk, so that the proper action of the said seed-disk may be observed and its regular planting assured. At the central portion of the hopper is a ∧-shaped partition, whereby the area of the grain at the bottom of the hopper is limited to the width of the discharge-openings of the seed-slide, so that the friction and pressure of the grain upon the seed-disk are reduced to a minimum.

G is the pole or tongue for the attachment of the team, which is pivoted to the front cross-bar, A', of the machine-frame. Beneath the rear end of this tongue is pivoted a short arm, 11, which is connected through a bell-crank, 12, and bar 13 to a hand-lever, 14, adjacent the driver's seat H. Connected with this hand-lever 14 is a spring-bolt, 16, for retaining the parts in their adjusted position.

The object of pivoting the pole G and connecting its end with a hand-lever, as just described, is for the purpose of permitting the driver to tilt the front end of the machine-frame upward, and thus clear the plows from the ground when going to or from the field or turning around.

At the rear of the machine is pivoted a marker, M, which extends laterally upon either side of the frame, and to which a drag—such as a short chain or other suitable object, as at $m$, Figs. 1 and 2—is attached to mark the next row.

The ground-wheels are of such width apart and, together with the driving cog-wheels and seed-disk, of such relative diameter that each revolution of the ground-wheels causes a similar revolution of the seed-disk.

As before stated, the seed-disks are adjustable, and the openings thereof are provided with lips, so that the size of the seed-pockets may, upon adjusting the said disks, be increased or decreased, as desired, and said disk is of such diameter relatively to the width of the bottom of the hopper that the edges of the disk will project beyond the sides of the hopper, whereby the operation of the said seed-disk may be observed.

When going to and from the field, the gear-wheel 2 is raised by pressure of the foot of the driver upon the lever $l$, so that the seed-dropping mechanism is thus disconnected from the ground-wheels.

I claim—

1. The combination, in a seed-planter, with the frame A, suitable furrow-openers, D D, and coverers E E, of the loose ground-wheels C C, axle B, ratchet-wheel $b$, pawls $a\ a$, bevel gear-wheel 1, adjustable bevel gear-wheel 2, short vertical shaft 3, disk 5, and foot-lever $l$, all constructed and arranged as described, for the purposes specified.

2. In a seed-planter, the combination, with the short vertical shaft 3, of the seed-disk 5, secured to the top thereof and having openings 6 therein, removable and adjustable plates 7, having perforations 8 therein, with lip 9, and seed-hopper F, having a narrow bottom and $\Lambda$-shaped partition, substantially as described, for the purposes specified.

FRANK W. AYERS.

Witnesses:
JOHN HALL,
J. W. CALVERT,
C. L. WILSON.